Figure 1:
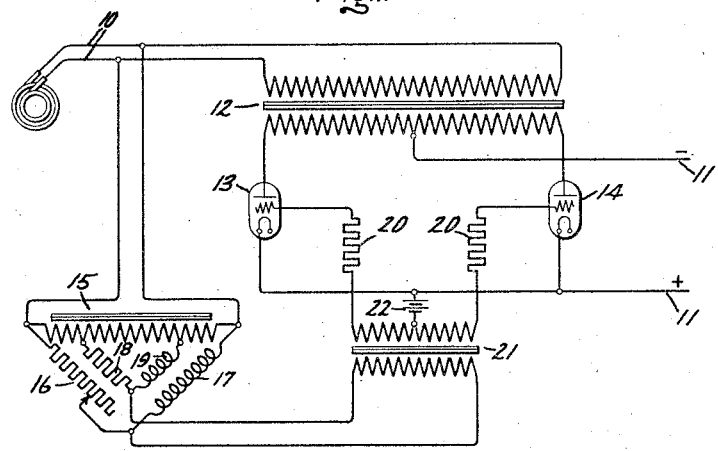

May 23, 1933.  B. D. BEDFORD  1,911,051

ELECTRIC PHASE SHIFTING CIRCUIT

Filed Nov. 16, 1932

Inventor:
Burnice D. Bedford,
by Charles E. Mullen
His Attorney.

Patented May 23, 1933

1,911,051

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

ELECTRIC PHASE SHIFTING CIRCUIT

Application filed November 16, 1932. Serial No. 642,927.

My invention relates to electric circuits for shifting the phase of an alternating potential derived from a source with respect to the potential of that source, and more particularly to such circuits by means of which a shift in phase of 180 degrees and more may be obtained by variation of the impedance of one of the circuit elements within practical limits.
While my invention is of general application in electric control and regulating systems, it is particularly adapted for use in connection with electric power converting apparatus including vapor electric valves for transmitting energy between direct and alternating current systems, or between two independent alternating current systems. In such apparatus it is customary to control the transmission of power between the two systems by shifting the phase of the potentials applied to the control grids of the vapor electric valves with respect to their anode potentials. Phase shifting circuits including various combinations of resistance and reactance, either inductive or capacitive, have proved to be very satisfactory arrangements for securing the variable phase grid potential from the standpoint of simplicity, economy and reliability. In the majority of the phase shifting circuits heretofore devised, however, it has been necessary to vary the impedance of one of the circuit elements from zero to infinity in order to secure a complete 180 degree phase shift, which is often desirable in order to secure the maximum flexibility in the control of the power converting apparatus. Obviously, such a wide variation of the impedance of a circuit element is a practical impossibility and, even in order to secure a reasonable range of phase shift, it has been necessary to vary the impedance of one of the circuit elements within extremely wide limits.

It is an object of my invention, therefore, to provide an improved impedance phase shifting circuit which will overcome the above-mentioned disadvantages of the arrangements of the prior art and by means of which a shift in phase of 180 degrees may be secured without extreme variations in the impedance of the circuit elements.

It is a further object of my invention to provide an improved impedance phase shifting circuit by means of which a shift in phase of more than 180 degrees can be obtained by moderate variation in the impedance of only one of the circuit elements.

In accordance with one embodiment of my invention, an inductive winding, or other voltage dividing means, is energized from an alternating current supply circuit to provide a pair of intermediate terminals. A pair of impedance elements are serially connected across the outer terminals of the voltage dividing means and these terminals are given such reactive characteristics that their component potentials are substantially in quadrature. A second pair of serially connected impedance elements is connected between the pair of intermediate terminals of the voltage dividing means and these second impedance elements also have such reactive characteristics as to produce component potentials substantially in quadrature. The desired potential of variable phase is then obtained from a circuit connected between the junction points of the two series circuits.

Figure 2:
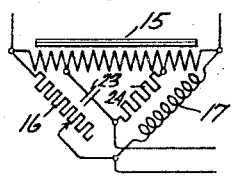

For a better understanding of my invention, together with other and further objects thereof, reference is had to the following description taken in connection with the accompanying drawing and its scope will be pointed out in the appended claims. In Fig. 1 of the drawing is illustrated an electric valve converting apparatus embodying my invention for transmitting energy between alternating and direct current circuits; Fig. 2 shows a modified form of my improved phase shifting circuit, while Fig. 3 is a vector diagram to aid in the understanding of my invention.

Referring now more particularly to Fig. 1 of the drawing, there is illustrated an arrangement for transmitting energy from an alternating current supply circuit 10 to a direct current load circuit 11. This apparatus comprises a transformer 12 provided with a primary winding connected to the circuit 10 and a secondary winding having an electrical midpoint connected to the negative side of the direct current circuit 11, and end terminals connected to the positive side of the direct current circuit 11 through electric valves 13 and 14. Each of the electric valves 13 and 14 is provided with an anode, a cathode and a control grid and may be of any of the several types well known in the art, although I prefer to use valves of the vapor electric discharge type. As is well understood by those skilled in the art, the amount of power transmitted between the alternating current circuit 10 and the direct current circuit 11 may be controlled by varying the phase of the potential applied between the grid and cathode of each of the valves 13 and 14 with respect to its anode potential. To this end there is provided an impedance phase shifting circuit comprising a voltage dividing means such, for example, as an inductive winding 15 provided with a pair of intermediate terminals, as illustrated; a substantially non-reactive resistance device such as a resistor 16 and a substantially non-restive reactance device, such as a reactor 17 serially connected between the end terminals of the inductive winding 15, and a substantially non-reactive resistor 18 and non-resistive reactor 19 serially connected between the pair of intermediate terminals of the inductive winding 15. The grids of the electric valve 13 and 14 are connected to their common cathode circuit through current limiting resistors 20, opposite halves of the secondary winding of a grid transformer 21, and a negative bias battery 22. The primary winding of the grid transformer 21 is connected between the junction points of the two series circuits comprising the variable resistor 16 and reactor 17 and the resistor 18 and reactor 19, respectively.

The general principles of operation of the above described apparatus will be well understood by those skilled in the art. In brief, if the grid potentials of the electric valves 13 and 14 be adjusted by means of the impedance phase shifting circuit substantially in phase with their anode potentials, each of the valves 13 and 14 will be conductive during its complete half cycles of positive anode potential and the average voltage delivered to the direct current circuit 11 will be a maximum. If the grid potentials of the electric valves 13 and 14 be retarded with respect to their anode potentials by means of the impedance phase shifting circuit, each of the valves 13 and 14 will become conductive at some later point in its respective half cycles of positive anode potential and the average voltage impressed upon the direct current circuit 11 will be correspondingly reduced.

Figure 3:
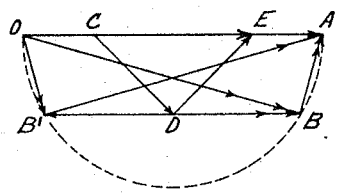

The manner in which the above described impedance phase shifting circuit is effective to produce an alternating potential variable in phase over a range of 180 electrical degrees will be best understood by reference to the vector diagram of Fig. 3. In this figure the vector OA represents the potential of the alternating current circuit 10, which is also the potential across the outer terminals of the inductive winding 15. It will be assumed that the variable resistor 16 is adjusted so that the component potential vectors across the resistor 16 and reactor 17 are represented by the vectors OB and BA, respectively. In this same figure the vector CE represents the potential between the intermediate terminals of the inductive winding 15 and the vectors CD and DE the component potentials across the resistor 18 and reactor 19, respectively. It is thus seen that the potential between the junction point of the series connected impedance elements 16 and 17, and 18 and 19, respectively, is represented by the vector DB and this is the potential impressed upon the primary winding of the grid transformer 21. Under the assumed conditions, it is seen that the grid potentials of the electric valves 13 and 14 are thus in phase with their anode potentials and the maximum average voltage will be impressed upon the direct current circuit 11, as described above. If the resistor 16 be adjusted to such a value that the component potential vectors across the resistor 16 and reactor 17 are represented by the vectors OB′ and B′A, respectively, the potentials impressed upon the grids of electric valves 13 and 14 will be represented by the vector DB′ which, it is seen, is retarded substantially 180 electrical degrees with respect to the anode potentials of the electric valves 13 and 14. Under these conditions, electric valves 13 and 14 will be maintained completely non-conductive. The locus of the points B, B′, etc., will be on the dotted line semicircle as illustrated, since the component potential vectors across the resistor 16 and reactor 17 will always be in quadrature.

In Fig. 2 is shown a modified form of my improved phase shifting circuit in which the series connected resistor 18 and reactor 19 of Fig. 1 are replaced by a series connected capacitor 23 and resistor 24. The vector relation of the component potentials of this phase shifting circuit are the same as that of Fig. 1. It will be noted that the impedance elements of the phase shifting circuits of Figs. 1 and 2 have been illustrated in their vectorial relation when the resistor 16 is adjusted to the same ohmic impedance as the reactor 17 and the output potential is retarded 90 electrical degrees. While I have illustrated two specific arrangements for securing the desired relation between the component potential vectors of the several impedance elements of the phase shifting circuit, it will be well understood by those skilled in the art that other combinations of resistance and reactance, either inductive or capacitive, may be substituted therefor without departing from my invention.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination with a source of periodic potential, apparatus for producing a potential variable in phase with respect to that of said source comprising a plurality of impedance elements serially connected across said source and having such reactive characteristics as to produce component potentials substantially in quadrature, means for varying the impedance of one of said elements, a plurality of other impedance elements serially connected across only a portion of said source and also having such reactive characteristics as to produce component potentials substantially in quadrature, and an output circuit connected between the junction points of said series circuits.

2. In combination with a source of alternating potential, apparatus for producing a potential variable in phase with respect to that of said source comprising a substantially non-reactive resistance element and a substantially non-resistive reactance element serially connected across said source for producing dephased potentials, means for varying the impedance of one of said elements, a second substantially non-reactive resistance element and a second substantially non-resistive reactance element serially connected across only a portion of said source for producing other dephased potentials, and an output circuit connected between the junction points of said series circuits.

3. In combination with a source of alternating potential, apparatus for producing a potential variable in phase with respect to that of said source comprising an inductive winding connected energized from said source and provided with a pair of intermediate terminals, a resistance element and a reactance element serially connected across said inductive winding for producing dephased potentials, a second resistance element and a second reactance element serially connected between said intermediate terminals for producing other dephased potentials, and an output circuit connected between the junction points of said series circuits.

In witness whereof, I have hereunto set my hand.

BURNICE D. BEDFORD.